(12) United States Patent
Tierling et al.

(10) Patent No.: US 7,769,417 B2
(45) Date of Patent: Aug. 3, 2010

(54) METHOD AND APPARATUS FOR PROVIDING HAPTIC FEEDBACK TO OFF-ACTIVATING AREA

(75) Inventors: Kollin Tierling, Milpitas, CA (US); Steve Vassallo, Redwood City, CA (US); Kenneth M. Martin, Los Gatos, CA (US)

(73) Assignee: Immersion Corporation, San Jose, CA (US)

( * ) Notice: Subject to any disclaimer, the term of this patent is extended or adjusted under 35 U.S.C. 154(b) by 361 days.

(21) Appl. No.: 10/314,017

(22) Filed: Dec. 8, 2002

(65) Prior Publication Data

US 2004/0110527 A1 Jun. 10, 2004

(51) Int. Cl.
*H04M 1/00* (2006.01)

(52) U.S. Cl. ............... 455/575.1; 345/156; 345/161; 345/157; 345/158; 345/163

(58) Field of Classification Search ......... 455/566, 455/575.3, 575.1, 556.2, 415; 345/107, 173
See application file for complete search history.

(56) References Cited

U.S. PATENT DOCUMENTS

| | | |
|---|---|---|
| 2,972,140 A | 2/1961 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 4,127,752 A | 11/1978 | Lowthorp |
| 4,160,508 A | 7/1979 | Frosch et al. |
| 4,236,325 A | 12/1980 | Hall et al. |
| 4,262,549 A | 4/1981 | Schwellenbach |
| 4,311,980 A | 1/1982 | Prudenziati |
| 4,333,070 A | 6/1982 | Barnes |
| 4,464,117 A | 8/1984 | Foerst |
| 3,157,853 A | 11/1984 | Hirsch |
| 4,484,191 A | 11/1984 | Vavra |
| 4,513,235 A | 4/1985 | Acklam et al. |
| 4,581,491 A | 4/1986 | Boothroyd |
| 4,581,972 A | 4/1986 | Hoshino |
| 4,599,070 A | 7/1986 | Hladky et al. |
| 4,692,756 A | 9/1987 | Clark |
| 4,708,656 A | 11/1987 | De Vries et al. |

(Continued)

FOREIGN PATENT DOCUMENTS

DE 198 31 808 A1 1/1999

(Continued)

OTHER PUBLICATIONS

PCT Search Report, corresponding to PCT/US03/36494, mailed on Aug. 16, 2004.

(Continued)

*Primary Examiner*—Charles N Appiah
*Assistant Examiner*—Randy Peaches
(74) *Attorney, Agent, or Firm*—Kilpatrick Stockton LLP

(57) ABSTRACT

The present invention comprises products and processes for providing haptic feedback at a location other than an input device. For example, when an input device disposed in a hand-held device is activated, instead of providing haptic feedback at the input device itself or to the entire device, haptic feedback is provided to a different area of the device (such as, for example, the side of the device opposite the side on which the input device resides).

12 Claims, 12 Drawing Sheets

U.S. PATENT DOCUMENTS

| | | |
|---|---|---|
| 4,713,007 A | 12/1987 | Alban |
| 4,725,817 A | 2/1988 | Wihlborg |
| 4,791,416 A | 12/1988 | Adler |
| 4,794,392 A | 12/1988 | Selinko |
| 4,795,296 A | 1/1989 | Jau |
| 4,798,919 A | 1/1989 | Miessler et al. |
| 4,821,030 A | 4/1989 | Batson et al. |
| 4,823,106 A | 4/1989 | Lovell |
| 4,840,634 A | 6/1989 | Muller et al. |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,982,918 A | 1/1991 | Kaye |
| 4,983,786 A | 1/1991 | Stevens et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,053,585 A | 10/1991 | Yaniger |
| 5,078,152 A | 1/1992 | Bond |
| 5,116,051 A | 5/1992 | Moncrief et al. |
| 5,165,897 A | 11/1992 | Johnson |
| 5,175,459 A | 12/1992 | Danial et al. |
| 5,182,557 A | 1/1993 | Lang |
| 5,186,695 A | 2/1993 | Mangseth et al. |
| 5,212,473 A | 5/1993 | Louis |
| 5,223,658 A | 6/1993 | Suzuki |
| 5,237,327 A | 8/1993 | Saitoh et al. |
| 5,240,417 A | 8/1993 | Smithson et al. |
| 5,241,308 A | 8/1993 | Young |
| 5,246,316 A | 9/1993 | Smith |
| 5,271,290 A | 12/1993 | Fischer |
| 5,275,174 A | 1/1994 | Cook |
| 5,283,970 A | 2/1994 | Aigner |
| 5,289,273 A | 2/1994 | Lang |
| 5,299,810 A | 4/1994 | Pierce |
| 5,309,140 A | 5/1994 | Everett |
| 5,334,027 A | 8/1994 | Wherlock |
| 5,355,148 A | 10/1994 | Anderson |
| 5,390,128 A | 2/1995 | Ryan et al. |
| 5,390,296 A | 2/1995 | Crandall et al. |
| 5,402,499 A | 3/1995 | Robinson et al. |
| 5,402,680 A | 4/1995 | Korenaga |
| 5,436,622 A | 7/1995 | Gutman et al. |
| 5,437,607 A | 8/1995 | Taylor |
| 5,451,924 A | 9/1995 | Massimino et al. |
| 5,461,711 A | 10/1995 | Wang et al. |
| 5,466,213 A | 11/1995 | Hogan |
| 5,489,812 A | 2/1996 | Furuhata et al. |
| 5,496,174 A | 3/1996 | Garner |
| 5,514,150 A | 5/1996 | Rostoker |
| 5,521,336 A | 5/1996 | Buchanan et al. |
| 5,547,382 A | 8/1996 | Yamasaki |
| 5,565,840 A | 10/1996 | Thorner et al. |
| 5,575,761 A | 11/1996 | Hajianpour |
| 5,631,861 A | 5/1997 | Kramer |
| 3,911,416 A | 10/1997 | Feder |
| 5,684,722 A | 11/1997 | Thorner et al. |
| 5,691,747 A | 11/1997 | Amano |
| 5,709,219 A | 1/1998 | Chen et al. |
| 5,729,249 A | 3/1998 | Yasutake |
| 5,766,016 A | 6/1998 | Sinclair |
| 5,767,457 A | 6/1998 | Gerpheide et al. |
| 5,785,630 A | 7/1998 | Bobick et al. |
| 5,791,992 A | 8/1998 | Crump et al. |
| 5,844,392 A | 12/1998 | Peurach et al. |
| 5,857,986 A | 1/1999 | Moriyasu |
| 5,887,995 A | 3/1999 | Holehan |
| 5,889,670 A | 3/1999 | Schuler et al. |
| 5,889,672 A | 3/1999 | Schuler et al. |
| 5,917,906 A | 6/1999 | Thornton |
| 5,943,044 A | 8/1999 | Martinelli et al. |
| 5,945,772 A | 8/1999 | Macnak et al. |
| 5,973,441 A | 10/1999 | Lo et al. |
| 5,977,867 A | 11/1999 | Blouin |
| 5,988,902 A | 11/1999 | Holehan |
| 6,059,506 A | 5/2000 | Kramer |
| 6,078,126 A | 6/2000 | Rollins et al. |
| 6,088,019 A * | 7/2000 | Rosenberg ............... 345/156 |
| 6,097,964 A | 8/2000 | Nuovo et al. |
| 6,111,577 A | 8/2000 | Zilles et al. |
| 6,118,435 A | 9/2000 | Fujita et al. |
| 6,131,097 A | 10/2000 | Peurach et al. |
| 6,160,489 A | 12/2000 | Perry et al. |
| 6,195,592 B1 | 2/2001 | Schuler et al. |
| 6,198,206 B1 | 3/2001 | Saarmaa et al. |
| 6,218,958 B1 | 4/2001 | Eichstaedt et al. |
| 6,218,966 B1 | 4/2001 | Goodwin et al. |
| 6,219,034 B1 | 4/2001 | Elbing et al. |
| 6,225,976 B1 | 5/2001 | Yates et al. |
| 6,307,465 B1 | 10/2001 | Kayama et al. |
| 6,349,201 B1 | 2/2002 | Ford |
| 6,373,463 B1 | 4/2002 | Beeks |
| 6,374,255 B1 | 4/2002 | Peurach et al. |
| 6,388,655 B1 | 5/2002 | Leung |
| 6,389,302 B1 | 5/2002 | Vance |
| 6,422,941 B1 | 7/2002 | Thorner et al. |
| 6,422,943 B2 | 7/2002 | Shinohara et al. |
| 6,429,846 B2 | 8/2002 | Rosenberg et al. |
| 6,543,487 B2 | 4/2003 | Bazinet |
| 6,587,091 B2 | 7/2003 | Serpa |
| 6,597,347 B1 | 7/2003 | Yasutake |
| 6,822,635 B2 * | 11/2004 | Shahoian et al. ............ 345/156 |
| 2001/0000663 A1 | 5/2001 | Shahoian et al. |
| 2002/0033795 A1 | 3/2002 | Shahoian et al. |
| 2002/0128048 A1 | 9/2002 | Aaltonen et al. |
| 2002/0149561 A1 | 10/2002 | Fukumoto et al. |
| 2002/0177471 A1 | 11/2002 | Kaaresoja et al. |
| 2003/0122779 A1 * | 7/2003 | Martin et al. ............... 345/156 |
| 2004/0227721 A1 * | 11/2004 | Moilanen et al. ........... 345/107 |

FOREIGN PATENT DOCUMENTS

| | | |
|---|---|---|
| EP | 0349086 | 1/1990 |
| EP | 0 688 125 A1 | 12/1995 |
| EP | 1182851 A1 | 2/2002 |
| EP | 1 213 188 A2 | 6/2002 |
| GB | 2 327 366 A | 1/1999 |
| JP | H2-185278 | 7/1990 |
| JP | H4-8381 | 1/1992 |
| JP | H5-192449 | 8/1993 |
| JP | H7-24147 | 1/1995 |
| JP | 11019336 A * | 1/1999 |
| JP | 2001-350592 A | 12/2001 |
| JP | 2002-259059 A | 9/2002 |
| WO | WO 9520787 | 8/1995 |
| WO | WO 97/18546 A1 | 5/1997 |
| WO | WO 00/30026 | 5/2000 |
| WO | WO 02/12991 A1 | 2/2002 |
| WO | WO 02/27645 | 4/2002 |
| WO | WO 02/31807 A1 | 4/2002 |
| WO | WO 0191100A1 A | 11/2002 |
| WO | WO 03/042805 A1 | 5/2003 |

OTHER PUBLICATIONS

Bliss, "Optical-to-Tactile Image Conversion for the Blind," IEEE Transactions on Man-Machine Systems, vol. MMS-11, No. 1, Mar. 1970.

Cadler, "Design of A Force-Feedback Touch-Introducing Actuator For Teleoperator Robot Control," Bachelor of Science Thesis, MIT, Jun. 23, 1983.

Fokumoto, "Active Click: Tactile Feedback For Touch Panels," ACM CHI2001 Extended Abstracts, pp. 121-122, Apr. 2001.

Johnson, "Shape-Memory Alloy Tactile Feedback Actuator," Armstrong Aerospace Medical Research Laboratory, AAMRL-TR-90-039, Aug. 1990.

Kontarinis et al., "Tactile Display of Vibratory Information in Teleoperatlon and Virtual Environments,"PRESENCE, 4(4):387-402. 1995.

Lake, "Cyberman from Logitech," GameBytes, 1994.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

SMK Corporation, "Multi-Functional Touch Panel, Force-Feedback Type, Developed: A Touch Panel Providing a Clicking Feeling," http://www.smk.co.jp/whatinew_e/628csc_e.html, Sep. 30, 2002.

SMK Corporation, "Force Feedback Type Optical Touch Panel Developed," SMK Corporation Website, Oct. 30, 2002.

Wiker, "Teletouch Display Development: Phase 1 Report," Technical Report 1230, Naval Ocean Systems Center, San Diego, Apr. 17, 1989.

Baigrie. "Electric Control Loading—A Low Cost, High Performance Alternative," Proceedings, pp. 247-254, Nov. 6-8, 1990.

Iwata, "Pen-based Haptic Virtual Environment" 0-7803-1363-1/93 IEEE, pp. 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4619 Springer International (Springer-Vertag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display In Molecular Docking," Order No. 9034744, p. 1-369, 1990.

Tadros, Control System Design for a Three Degree of Freedom Virtual Environment Simulator Using Motor/Brake Pair Actuators, MIT Archive © Massachusetts Institute of Technology, pp. 1-88, Feb. 1990.

Caldwell et al., "Enhanced Tactile Feedback (Tele-Traction) Using a Multi-Functional Sensory System," 1050-4729/93, pp. 955-960, 1993.

Adelstein. "Design and Implementation of a Force Reflecting Manipulandum for Manual Control research," DSC-vol. 42, Advances in Robotics, Edited by H. Kazerooni, pp. 1-12, 1992.

Gotow et al, "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSV-vol. 42, Advances in Robotics, pp. 55-61, ASME 1992.

Russo, "Controlling Dissipative Magnetic Particle Brakes in Force Reflective Devices," DSC-vol. 42, Advances in Robotics, pp. 83-70. ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM. Sep. 8-12. 1981.

McAffee. "Teleoperator Subsystem/Telerobot Demonsdtrator. Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Textue for a Force-Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation" Proceedings of Fourth Annual Conference on Intelligent Robotic Systems for Space Exploration, Rensselaer Polytechnic Institute, Sep. 30-Oct. 1, 1992.

IBM Technical Disclosure Bullein, "Mouse Ball-Actuating Device With Force and Tactile Feedback," vol. 32, No. 9B, Feb. 1990.

Terry et al., "Tactile Feedback in A Computer Mouse," Proceedings of Fourteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and def-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contractor area," Journal of The Accoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy et al., "A Laboratory Breadboard System For Dual-Arm Teleoperation." SOAR '89 Workshop. JSC, Houston, TX, Jul. 25-27, 1989.

Ouh-Young, "A Low-Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8-11, 1994.

Bejczy, et al., "Universal Computer Control System (UCCS) For Space Telerobots," CH2413-3/87/0000/0318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction. vol. 7, No. 1, pp. 1-24. 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," Logitech Cyberman SWIFT Supplement, Apr. 5, 1994.

Ouhyoung et al., "The Development of A Low-Cost Force Feedback Joystick and Its Use in the Virtual Reality Environment," Proceedings of the Third Pacific Conference on Computer Graphics and Applications. Pacific Graphics '95, Seoul, Korea, Aug. 21-24, 1995.

Kaczmarek et al., "Tactile Displays" Virtual Environment Technologies.

Wakiwaka et al., "Influence of Mover Support Structure on Linear Oscillatory Actuator for Cellular Phones," The Third International Symposium on Linear Drives for Industry Applications, 2001, p. 260-263 Nagano, Japan.

"Taking a Joystick Ride", Computer Currents, Tim Scannell, Nov. 1994, Boston Edition, vol. 9 No. 11.

"Coaxial Control Shaker Part No. C-25502," Safe Flight Instrument Corporation, 26 pages, Jul. 1, 1967; Revised Jan. 28, 2002.

United States Patent and Trademark Office, Office Action, U.S. Appl. No. 11/753,987, mailed May 1, 2008.

* cited by examiner

METHOD AND APPARATUS FOR PROVIDING HAPTIC FEEDBACK TO OFF-ACTIVATING AREA

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

FIELD OF THE INVENTION

The invention generally relates to an apparatus and a method for providing haptic feedback.

BACKGROUND

Handheld electronic devices, such as mobile phones, personal digital assistants (PDAs), pocket personal computers (PCs), gamepads, and camcorders, generally have multiple of buttons that allow one to interface with the device by inputting information. The capabilities of these devices are increasing while their size and weight are decreasing to enhance their portability. For example, mobile phones, in addition to their traditional role as voice-communication devices, now include functions traditionally associated with other devices, such as electronic games, PDAs, and digital cameras. At the same time, consumers seek smaller, lighter devices.

To support these multiple functions, a screen display is often used. Thus, the area on devices devoted to user input, i.e., the activating or input area, is becoming increasingly complex in terms of the number of functions available to be input, while the physical size of the input area is decreasing. Moreover, the available size of the input area must compete with the size of the visual display.

To permit effective interaction with these devices, visual and audio cues or feedback are provided by the conventional device. In addition to conventional visual and audio feedback, some of these devices attempt to enhance the effectiveness of device feedback by providing tactile cues or feedback. Some devices utilize structural tactile methods. One such example is to provide raised surfaces on the input surface, e.g., keypad, of the device. Such methods, however, are inherently static and thus cannot offer a wide array of, or effective, tactile feedback.

Active methods of providing tactile feedback include incorporating haptics into handheld electronic devices. These active methods of providing haptic cues generally include vibrating the entire device. Some devices have incorporated haptic feedback into a surface of the device instead of vibrating the entire device. In such devices, the haptic feedback is provided to the input area, i.e., the activating area. However, the limited size of the input area in a hand-held device provides a very limited area in which to provide meaningful haptic feedback. Furthermore, the amount of physical contact with the input area is generally limited to a small surface of a finger while inputting information to the device. Moreover, in typical active methods, the frequencies at which the devices are vibrated have been in very limited ranges—typically between 20 Hz and 28 Hz. The number of haptic cues that can be conveyed in such a range is very limited.

SUMMARY OF THE INVENTION

The present invention comprises products and processes for providing haptic feedback at a location other than an input device. Embodiments of the present invention may take a wide variety of forms. Examples of input devices include, without limitation, buttons, keys, and directional pads on a mobile telephone. In one exemplary embodiment, when an input device present in a hand-held device is activated, instead of providing haptic feedback at the input device itself or to the entire device, haptic feedback is provided to a different area of the device (such as, for example, the side of the hand-held device opposite the side on which the input device resides). In other exemplary embodiments, haptic feedback is also provided at the input device and/or to the entire device, structural guides are employed to guide a user's hands to the right location, and/or the area at which the haptic feedback is provided also serves as an input device.

These exemplary embodiments are mentioned not to summarize the invention, but to provide an example of an embodiment of the invention to aid understanding. Exemplary embodiments are discussed in the Detailed Description, and further description of the invention is provided there. Mobile telephones, PDAs, and gamepads benefit from employing such products and processes, but other devices benefit as well. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Embodiments of the present invention include products and processes for providing haptic feedback at an area different than the input area. In some interface devices, kinesthetic feedback (such as, without limitation, active and passive force feedback), and/or tactile feedback (such as, without limitation, vibration, texture, and heat), is also provided to the user, more generally known collectively as "haptic feedback." In certain embodiments, haptic feedback is provided only at an area different from the input area. In other embodiments, haptic feedback is also provided at the input area. The invention may be embodied in hand-held devices, such as mobile phone, PDAs, pagers, and camcorders, but may be embodied in other devices as well.

Figure 1:
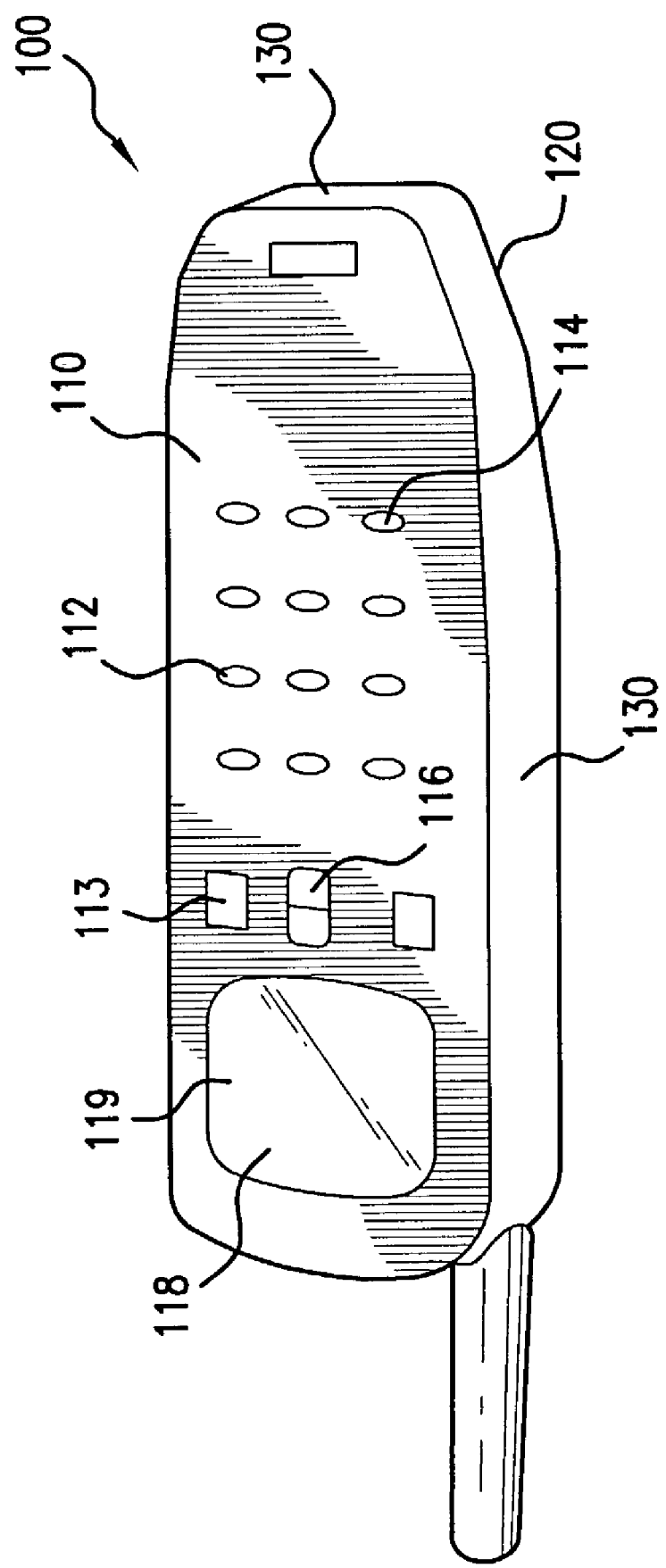
FIG. 1 is a perspective view of a mobile phone according to an embodiment of the present invention.

FIG. 1 is a perspective view showing a mobile phone 100 according to an embodiment of the present invention. The phone 100 includes a first surface 110, a second surface 120, and a plurality of walls 130. The plurality of walls 130 define a volume 140 (shown in FIGS. 3 and 4). As shown in FIG. 1, the walls 130 are coupled to the first surface 110 and the second surface 120. Preferably, the first surface 110 and the second surface 120 are distinct. While the first and second surfaces 110, 120 shown in FIG. 1 are separate from one another, in an alternate embodiment, the first and second surfaces 110, 120 can be contiguous.

The embodiment shown in FIGS. 1-4 includes a means for receiving an input signal. The means for receiving an input signal includes means for detecting a plurality of distinct pressures. The means for receiving an input signal and the means for detecting a plurality of distinct pressures in the embodiment shown in the FIG. 1 includes a keypad 114, a switch 116, and a touch-sensitive screen 118. The keypad 114, the switch 116, and the touch-sensitive screen 118 are described further below. Other means for receiving an input signal and means for detecting a plurality of distinct pressures may be used in other embodiments, for example, a D-pad, scroll wheel, and toggle switch. Structures described herein for receiving an input signal and for detecting a plurality of distinct pressures, or other structures may be used. Any suitable structure that can receive an input signal and that can detect a plurality of distinct pressures may be used.

Disposed in the first surface 110 are several input elements 112. Other embodiments may include one input element (such as a touch-screen). The input elements 112 shown in FIG. 1 include the keypad 114, switch 116, and touch-sensitive screen 118. The touch-sensitive screen 118 is disposed in a video display screen 119. In other embodiments, input elements can include, for example, D-pads, scroll wheels, and toggle switches.

Information—through the generation of a signal—is generally input into the phone 100 through the input elements 112 disposed in the first surface 110 (hereinafter referred to as the input surface). Information can be input by physically contacting the input elements 112 with a digit of a hand, or with a device, such as a stylus. Alternatively, data can be input in the phone 100 remotely. For example, data can be transmitted wirelessly from a remote processor (not shown) to the phone 100. In another example, the phone 100 can be placed in a cradle-like device (not shown), which is operative to communicate with the remote processor and the phone 100. Data can be entered into the phone 100 placed in the cradle-like device through the remote processor by keying-in data on a keyboard, which is operative to communicate with the remote processor.

Figure 2:
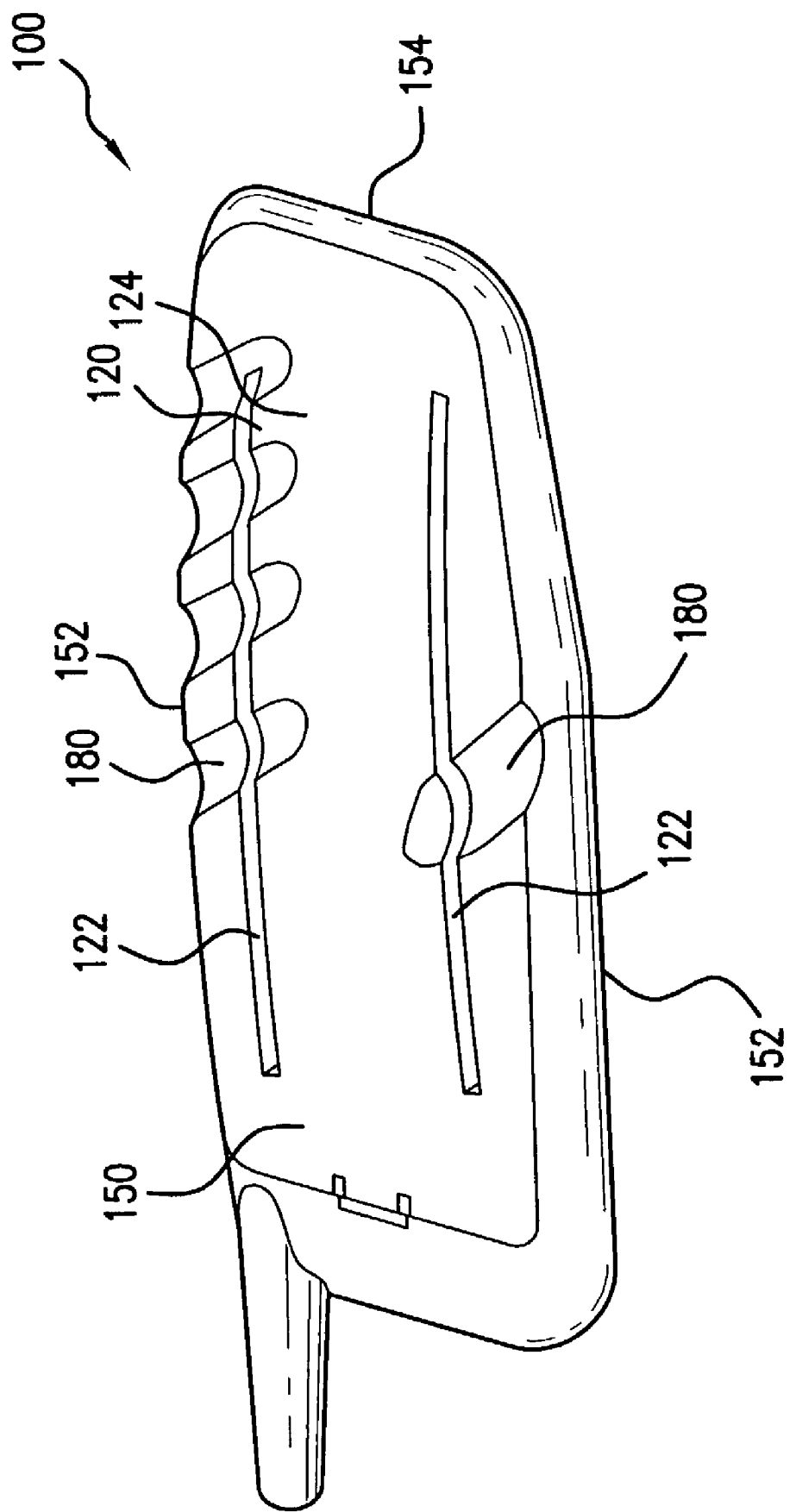
FIG. 2 is a perspective view of a surface of an off-activating area of the mobile phone of FIG. 1.

FIG. 2 shows an exterior surface 124 of the second surface 120 (hereinafter referred to as the off-activating surface to indicate that it is different from the input surface) of the phone 100. The off-activating surface 120 is formed from a battery cover panel 150. Alternatively, an off-activating surface can be formed of a separate panel (not shown) coupled with the phone. The off-activating surface 120 shown is formed of a flexible material. Alternatively, the off-activating surface 120 can include a flexural member. Preferably, the off-activating surface 120 is formed of plastic. Alternatively, any other suitable material can be used.

In the embodiment shown in FIG. 2, two grooves 122 are disposed in the off-activating surface 120. The grooves 122 increase the flexibility of the off-activating surface 120. The term "flexibility" refers to any displacement that is generally perceptible—by sight, sound, or touch—to one observing or holding the phone. Increased flexibility of the off-activating surface 120 provides a greater range of frequencies—especially those frequencies detectable by the hand—at which the off-activating surface 120 can vibrate. Preferably, the grooves 122 are disposed through an entire thickness of the off-activating surface 120. Alternatively, the grooves 122 can be disposed partially through the off-activating surface 120. The grooves 122 can be formed in the off-activating surface 120 during molding of the battery cover panel 150. Alternatively, the grooves 122 can be formed into the battery cover panel 150 subsequent to molding the battery cover panel 150.

Preferably, the grooves 122 extend substantially along a major length of the battery cover panel 150. Alternatively, the grooves 122 can extend in any suitable length along the battery cover panel 150. Preferably, the grooves 122 are disposed substantially parallel and proximate to the edges 152 of the battery cover panel 150. Alternatively, the grooves 122 can be disposed in any other suitable configuration. The configuration, i.e., length, depth, shape, number and position, of the grooves 122 can be varied to obtain the desired resonant characteristics of the off-activating surface 120.

Also preferably formed in the exterior surface 124 of the off-activating surface 120 is a plurality of channels 180. The channels 180 shown are recessed to accept digits of a hand. The channels 180 guide a user's hand when holding the phone 100 and maximize the amount of physical contact between the hand and the off-activating surface 120.

The embodiment shown in FIGS. 1-4 includes a means for providing haptic feedback and a means for producing a plurality of distinct haptic sensations. The means for providing haptic feedback and the means for producing a plurality of distinct haptic sensations in the embodiment shown in FIGS. 1-4 comprises an actuator 160 in combination with a local processor (not shown). The actuator 160 and the local processor are described further below. Other means for providing haptic feedback and for producing a plurality of distinct haptic sensations may be used in other embodiments. For example, a voice coil and a permanent magnet, rotating masses, a piezo material, such as quartz, Rochelle Salt, and synthetic polycrystalline ceramics, piezoelectric ceramics, piezoelectric films, and electroactive polymers can be used. Additionally, a remote processor can be used. Structures described herein for providing haptic feedback and for producing a plurality of distinct haptic sensations, or other structures may be used. Any suitable structure that can provide haptic feedback and that can produce a plurality of distinct haptic sensations may be used.

Figure 3:
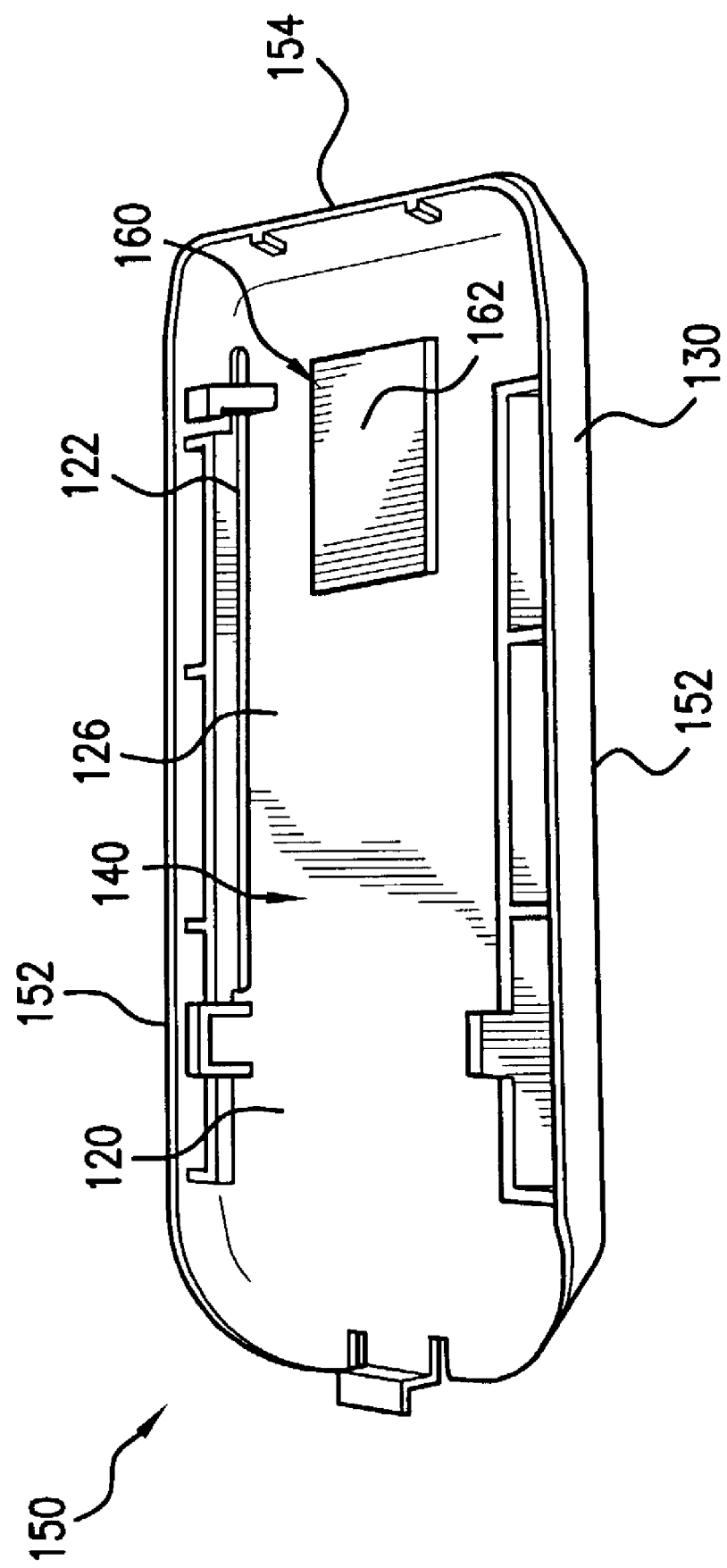
FIG. 3 is a perspective view of another surface of the off-activating area of the mobile phone of FIG. 1.

FIG. 3 is a perspective view of an interior surface 126 of the off-activating surface 120 of the phone 100. As can be seen in FIG. 3, the grooves 122 are disposed entirely through the battery cover panel 150 from the exterior surface 124 of the off-activating surface 120 to the interior surface 126 of the off-activating surface 120. Disposed in the volume 140 is an actuator 160. In other embodiments, two or more actuators are so disposed.

Figure 4:
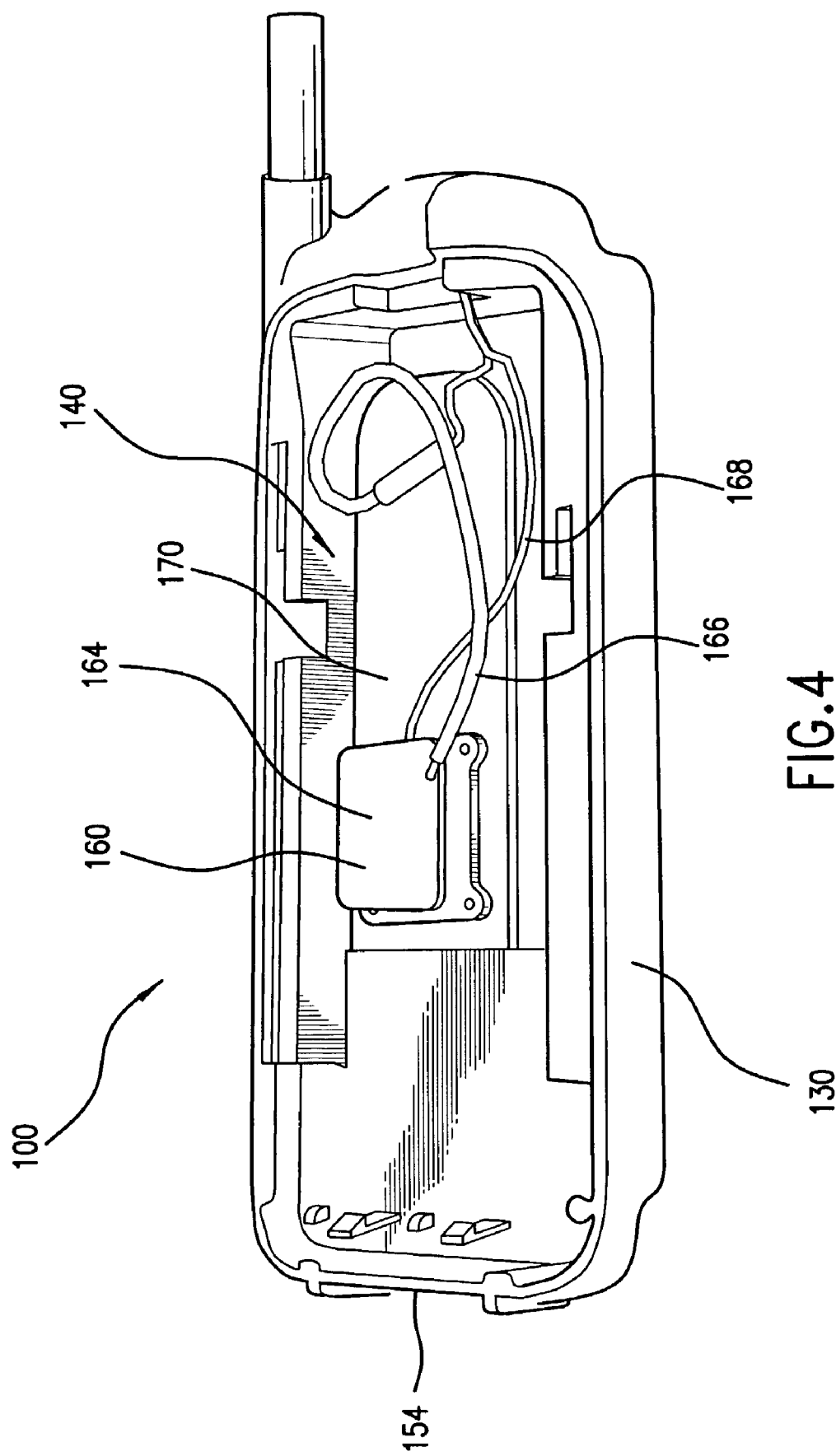
FIG. 4 is a perspective view of an internal surface of the mobile phone of FIG. 1.

The actuator 160 shown in FIGS. 3 and 4 includes an actuator magnet 162 and an actuator voice coil 164. Preferably, the actuator magnet 162 is a permanent magnet and the actuator voice coil 164 is an electromagnet. Alternatively, the actuator 160 can be formed of a piezo material, such as quartz, Rochelle Salt, and synthetic polycrystalline ceramics. Other alternative actuators can include rotating masses, piezoelectric ceramics, piezoelectric films, and electroactive polymers. Any other suitable actuator can be used. Piezo material is bi-directional in its displacement, and actuates when an electric field is applied to it. Preferably, the actuator 160 is disposed proximate the base 154 of the battery cover panel 150. Alternatively, the actuator 160 can be disposed in any other suitable area of the volume 140.

In the embodiment shown in FIG. 3, the actuator 160 is coupled to the off-activating surface 120. As shown in FIG. 3, the actuator 160 is coupled directly to the interior surface 126 of the off-activating surface 120 by the actuator magnet 162. Alternatively, the actuator 160 can be coupled to the off-activating surface 120 by a coupling (not shown), i.e., an intermediary element. Alternatively, the actuator 160 can indirectly, i.e., without a direct physical connection, actuate the off-activating surface 120 by transmitting energy, such as sound waves or electromagnetic pulses, to the off-activating surface 120.

FIG. 4 is a perspective view of an internal surface of the phone 100 of FIGS. 1-3. The actuator voice coil 164 is coupled to a rigid surface 170. In an alternative embodiment, the actuator voice coil 164 is coupled to a dampening member. A dampening member is either inflexible itself or, over a period of time, deadens or restrains physical displacement. The rigid surface 170 is disposed in the volume 140 of the phone 100. Preferably, the rigid surface 170 is a PC board of the phone 100. Alternatively, the actuator voice coil 164 can be coupled with any other suitable surface. The actuator voice coil 164 shown is disposed proximate the actuator magnet 162. Alternatively, the actuator voice coil 164 can be disposed in any other suitable location in the volume 140.

The actuator voice coil 164 is electrically connected to the power supply (not shown) of the phone 100—generally the phone 100 is powered by a direct current (DC) power source, such as a battery. The actuator voice coil 164 is electrically connected to the power supply of the phone 100 by a first power supply wire 166 and a second power supply wire 168. Alternatively, the actuator voice coil 164 can have a power source (not shown) separate from the power source of the phone 100.

The rigid surface 170 preferably remains substantially static with respect to the off-activating surface 120. The term "substantially static" does not mean that the rigid surface 170 is completely devoid of any measurable movement. The rigid surface 170 can be displaced when the actuator 160 imparts energy to actuate the off-activating surface 120. Rather, "substantially static" means that any displacement of the rigid surface 170 is generally imperceptible, or only minimally perceptible, to one observing or holding the phone 100. Alternatively, the rigid surface 170 can be displaced when the actuator 160 causes the off-activating surface 120 to actuate such that it is perceptible to one observing or holding the phone 100. The rigid surface 170 can be displaced at a same or different frequency than that at which the off-activating surface 120 actuates.

The actuator 160 shown is operative to actuate the off-activating surface 120 at a frequency in a range between approximately 10 Hz and 300 Hz. When the actuator voice coil 164 is energized by the power source of the phone 100, the actuator magnet 162 is displaced toward the actuator voice coil 164. As the actuator magnet 162 is coupled with the off-activating surface 120, the off-activating surface 120 is also displaced toward the actuator voice coil 164 when the actuator voice coil 164 is energized.

Varying the amount of current to the actuator voice coil 164 can vary the amount of displacement of the actuator magnet 162 toward the actuator voice coil 164. Thus, the amount of displacement of the off-activating surface 120 can be regulated. When the actuator voice coil 164 is de-energized, the actuator magnet 162 is no longer displaced toward the actuator voice coil 164, and returns substantially to its original position. Likewise, the off-activating surface 120 returns substantially to its original position.

Repeatedly energizing and de-energizing the actuator voice coil 164 causes the actuator magnet 162, as well as the off-activating surface, to reciprocate between its original position and a position proximate the actuator voice coil 164. Thus, variations in the current delivered to the actuator voice coil 164 and the period between energizing and de-energizing the actuator voice coil resonates the off-activating surface 120.

The embodiment shown in FIGS. 1-4 includes a means for sending an actuation signal and a means for varying at least one of the frequency, waveform and magnitude of the haptic sensations. The means for sending an actuation signal and the means for varying at least one of the frequency, waveform and magnitude of the haptic sensations comprise the local processor. The local processor is described further below. Other means for determining pressure may be used in other embodiments. Other structures may be used, for example a remote processor. Any structure that can send an actuation signal and that can vary at least one of the frequency, waveform and magnitude can be used.

Preferably, a local processor (not shown) controls the actuation of the off-activating surface 120 by regulating the current delivered to the actuator voice coil 164, the duration of the current delivered to the actuator voice coil 164, the time between cycles of energizing the voice coil 164, and the number of cycles of energizing the voice coil 164. These conditions, i.e., frequency, waveform, and magnitude, can be varied to obtain desired resonant characteristics of the off-activating surface 120. Alternatively, the processor can be remote, i.e., separate from the phone 100. Thus, haptic feedback can be provided to the off-activating surface 120.

The local processor monitors the input elements 112 in the phone 100. When a plurality of input elements 112 is included, the processor can either monitor each input element 112 sequentially or in parallel. Monitoring the input elements 112 is preferably done as a continuous loop function.

The processor is in communication with the input elements 112 to receive input signals therefrom. The processor can also receive additional information from the input elements 112, including the position of the input elements 112 and the amount of pressure applied to the input elements 112. In one embodiment, the input signal includes information related to the amount of pressure applied to the input elements 112, information related to the position of the input elements 112, or a combination of information about pressure and position. In addition to being in communication with the input elements 112, the processor is in communication with the actuator 160 to produce a haptic response in the actuator 160 corresponding to the input or input signal received by the actuator 160 from the input elements 112.

The processor is located in a suitable location according to the needs of the device in which it is placed. In one embodiment, the processor is coupled (not shown) to the rigid surface 170. Suitable processors include, for example, digital logical processors capable of processing input, executing algorithms, and generating output as needed to create the desired haptic feedback in the off-activating surface 120 in response to the inputs received from the input elements 112.

Such processors can include a microprocessor, an Application Specific Integrated Circuit (ASIC), and state machines. Such processors include, or can be in communication with media, for example computer readable media, which stores instructions that, when executed by the processor, cause the processor to perform the steps described herein as carried out, or assisted, by a processor.

One embodiment of a suitable computer-readable medium includes an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

Figure 5:
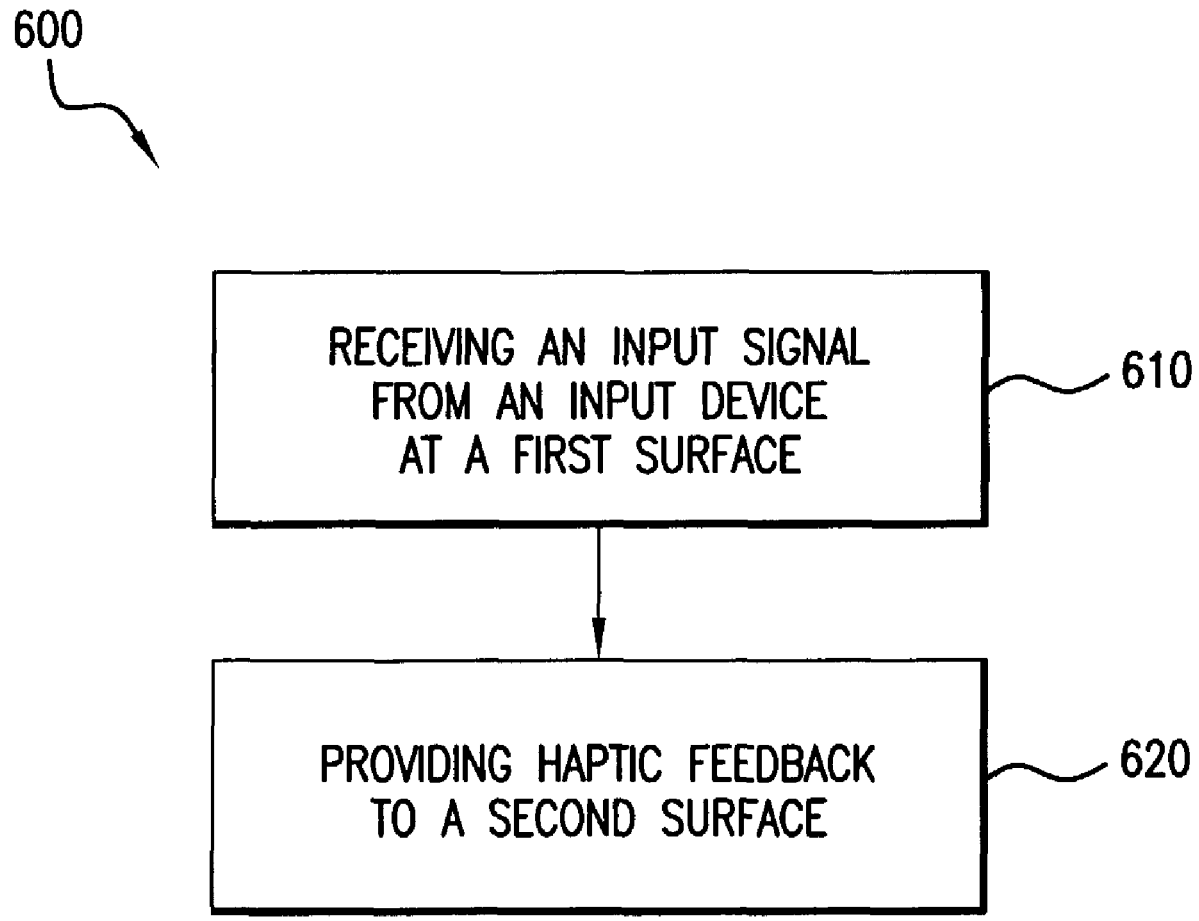
FIG. 5 is a block diagram of an embodiment of a method according to the present invention.

FIG. 5 shows an embodiment of a method 600 of providing haptic feedback to at a location other than an input area. The method 600 may be employed in the phone 100 described above, and items shown in FIGS. 1-4 are referred to in describing FIG. 5 to aid understanding of the embodiment 600 shown. However, embodiments of methods according to the present invention may be employed in a wide variety of devices, including, without limitation, gamepads, PDAs, pagers, and automotive structures.

Referring to FIG. 5, a user activates an input device (such as a button 112) on a first area 110 of the mobile telephone 100. The input device 112 provides an input signal, comprising an indication that the input device 112 has been activated. In the embodiment shown, the input signal is received by a local processor (not shown) within the device 100. In other embodiments, the input signal is received by an actuator, a remote processor, or other product.

Still referring to FIG. 5, the next step 620 in the method shown 600 comprises providing haptic feedback to a second area 120 that is different from the input device 112. In the embodiment shown, this step 620 comprises the local processor sending an actuation signal to an actuator 160 that is in communication with the second area 120. The actuation signal comprises an indication that the actuator 160 should actuate (e.g., vibrate). The actuator 160 receives the actuation signal, and actuates. The communication between the second area 120 and the actuator 160 is configured such that the actuator's actuation provides haptic feedback (in the form of vibrations in the embodiment shown) to the second area 120. In other embodiments, this step 620 may comprise the actuator 160 receiving the input signal from the input device, and then actuating to provide haptic feedback to the second area 120.

Referring still to the embodiment shown in FIG. 5, preferably different input signals generate different actuation signals, and different input devices are configured to provide different input signals. In other embodiments, the processor includes an algorithm that is configured to provide desired haptic feedback in response to designated input signals or series of input signals.

As discussed above, the actuator is preferably a voice coil. Alternatively, the actuator can be a piezoceramic material. The operation of actuators has been described above and will not be repeated here. The actuator is in communication with a feedback area. The actuator can provide haptic feedback by actuating the feedback area. As discussed above, different haptics preferably are provided by regulating the current delivered to the actuator, the duration of the current delivered to the actuator, the time between cycles of energizing the actuator, and the number of cycles of energizing the actuator. These conditions can be varied to produce a variety of haptics to the feedback area.

Figure 6:
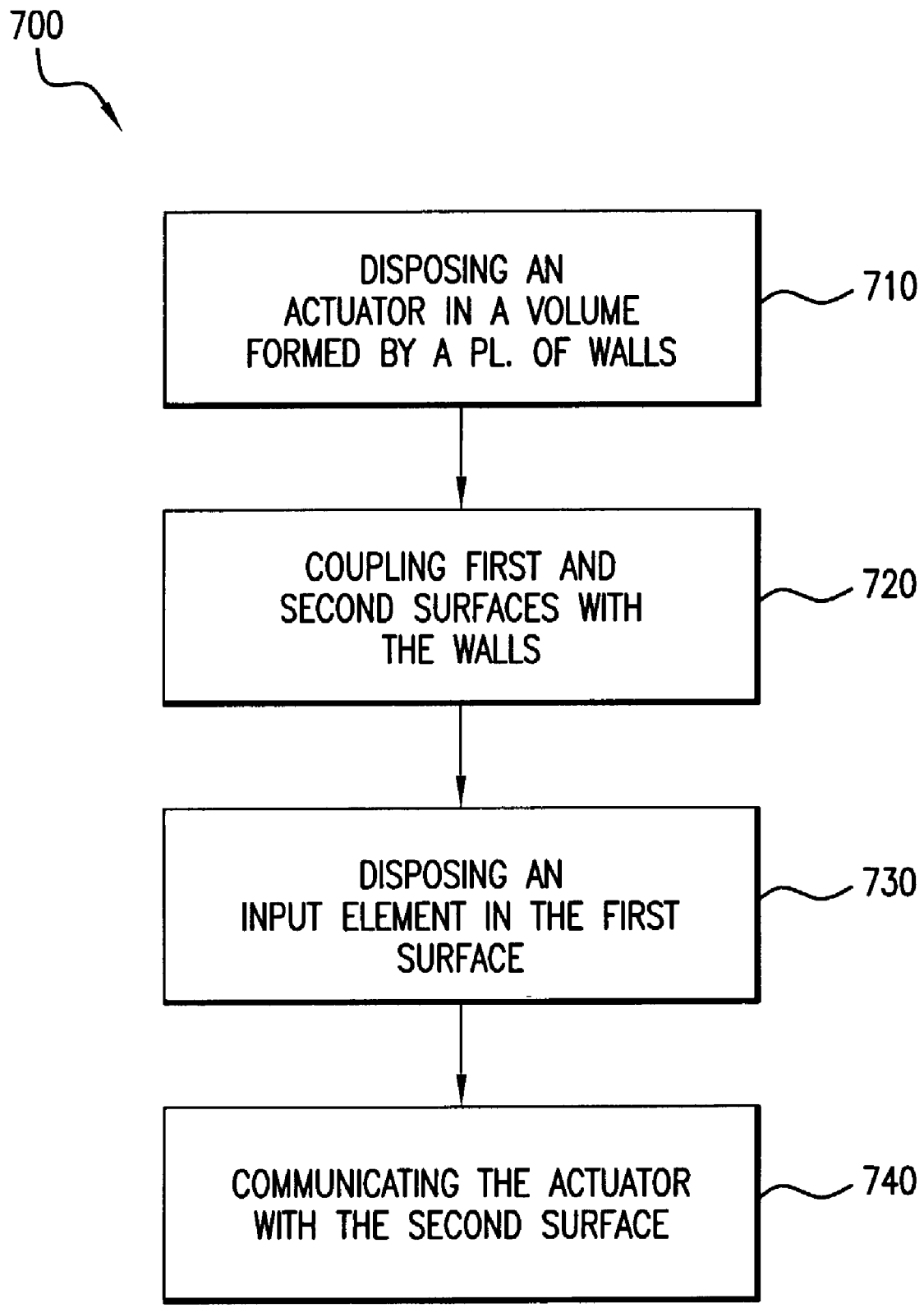
FIG. 6 is a block diagram of another embodiment of a method according to the present invention.

FIG. 6 shows an embodiment of a method 700 of providing haptic feedback to a feedback area of a device, such as the phone 100 described above. As indicated by block 710, the method 700 includes disposing an actuator in a volume formed by a plurality of walls. As discussed above, the actuator can be formed from a voice coil and a permanent magnet. Alternatively, the actuator can be formed of a piezo material, such as quartz, Rochelle Salt, and synthetic polycrystalline ceramics. Preferably, the actuator is coupled to a rigid surface disposed in the volume, and is electrically connected to a power supply and a processor disposed in the volume. Alternatively, the actuator can be configured to communicate with a remote power supply. Likewise, the actuator can be configured to communicate with a remote processor. For example, the actuator can be configured to communicate with a remote processor wirelessly.

As indicated by block 720, the method 700 includes coupling an input area and a feedback area with the walls. Preferably, the input and feedback areas are distinct. In one embodiment, the input and feedback areas are separate from one another. Alternatively, the input and feedback areas can be contiguous. As shown by block 730, the method includes disposing an input element in the input surface. As described above, the input element is preferably a keypad, a switch, and a touch-sensitive screen. Alternative input elements are described above.

As indicated by block 740, the method includes communicating the actuator with the feedback area. As described above, the actuator can directly contact the feedback area. With reference to the embodiment of the apparatus described above, the actuator magnet can be coupled directly to the feedback area. Alternatively, the actuator can be indirectly coupled to the feedback area. For example, the actuator can transmit energy, such as sound waves or electromagnetic pulses to the feedback area. In one embodiment, the method 700 includes disposing a coupling between the actuator and the feedback area. Preferably, the coupling is a mechanical linkage although any other suitable coupling can be used. The method 700 further includes communicating one end of the coupling with the actuator and communicating the other end of the coupling with the feedback area. In another embodiment, the method 700 includes actuating the feedback area at a first frequency. Preferably, the first frequency is in a range between approximately 10 Hz and 300 Hz.

Preferably, in one embodiment the method 700 includes forming at least one groove in the feedback area. The configuration, i.e., length, depth, width, number, and shape, of the grooves can be varied to obtain varying resonant characteristics of the feedback area. Actuating the off-activating surface with a voice coil and a permanent magnet has been described above.

Alternate embodiments of the apparatus according to the present invention will next be described with reference to FIGS. 7-13. Descriptions of like structures with the previously-described embodiments will not be repeated.

Figure 7:
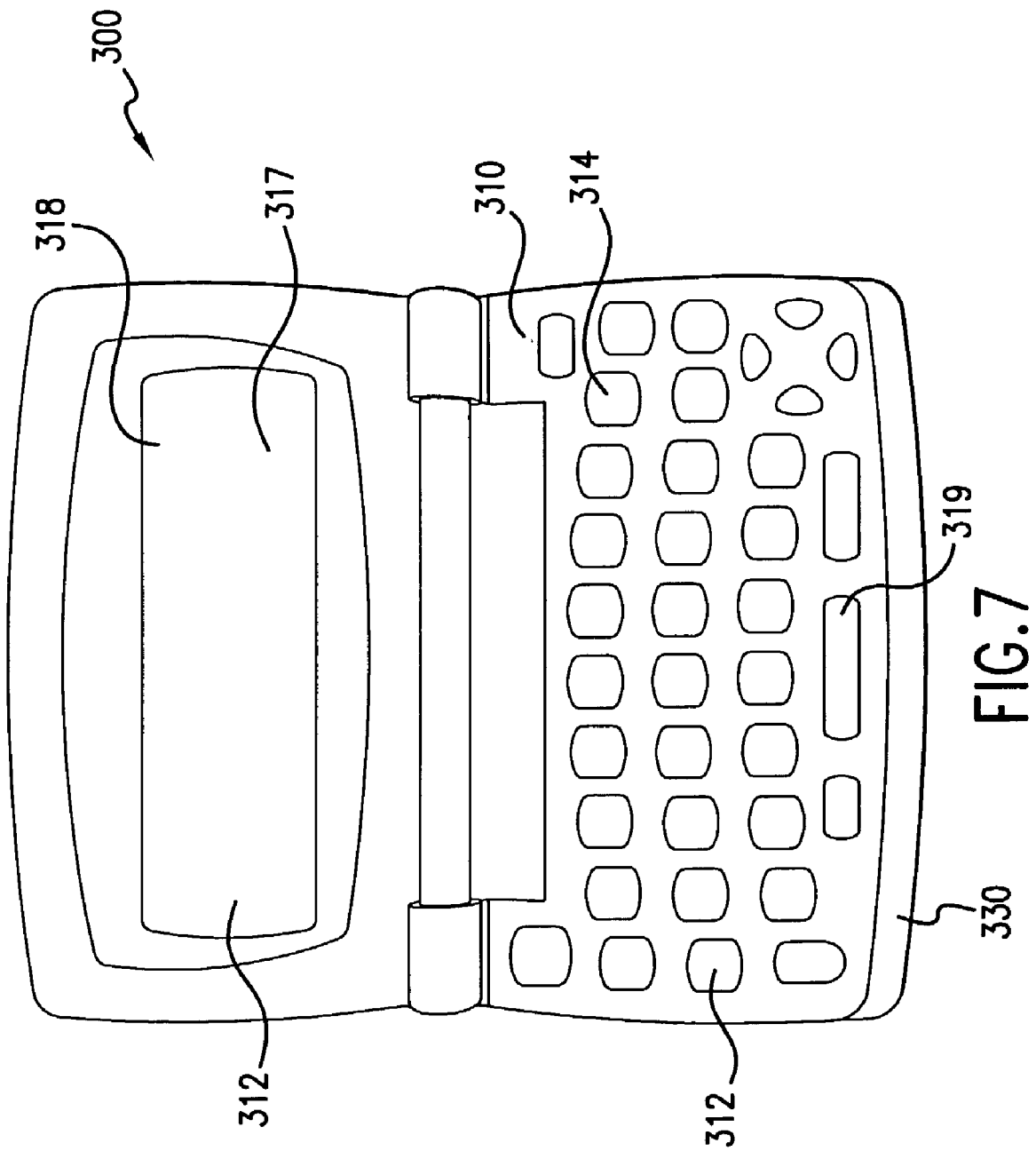
FIG. 7 is a perspective view of a text communication device according to another embodiment of the present invention.

FIG. 7 shows a perspective view of a text communication device 300 according to another embodiment of the present invention. An input surface 310 of the text communication device 300 preferably includes a plurality of input elements 312, a display screen 317, and a base 319. The plurality of input elements 312 includes a keypad 314 and a touch-sensitive screen 318 disposed in the display screen 317. Alternatively, there can only be one input element 312, such as a touch-sensitive screen 318.

Figure 8:
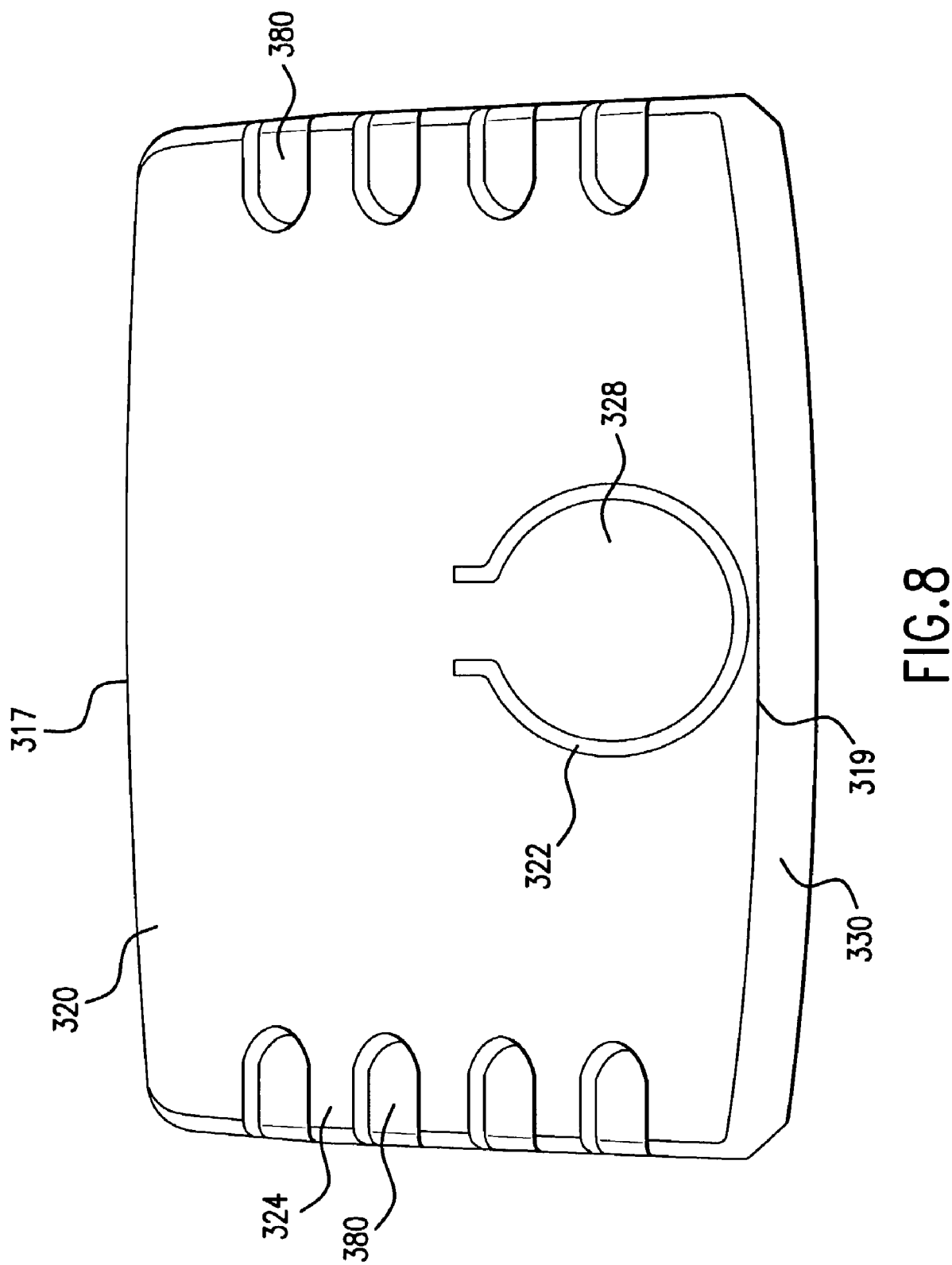
FIG. 8 is a perspective view of an off-activating area of the text communicating device of FIG. 7.

Referring now to FIG. 8, a perspective view of an off-activating surface 320 of the text communication device 300 of FIG. 7 is shown. The off-activating surface 320 includes an exterior surface 324. Disposed in the exterior surface 324 of the off-activating surface 320 is a groove 322 and a plurality of channels 380. The channels 380 shown are recessed to accept digits of a hand. The channels 380 guide a user's hand when holding the text communication device 300 and maximize the amount of physical contact between the hand and the off-activating surface 320.

The groove 322 is formed through an entire thickness of the off-activating surface 320. Preferably, the groove 322 is substantially continuous and forms a substantially circular panel 328 in the off-activating surface 320. Alternatively, the groove 322 can form any other suitable configuration. In this embodiment, the panel 328 is cantilevered from the off-activating surface 320. Thus, the off-activating surface 320 does not actuate with a uniform frequency. For example, the portion of the panel 328 proximate the base 319 actuates with a greater frequency than the off-activating surface proximate the display screen 317. The actuator (not shown) is disposed proximate the panel 328. As described above, the actuator is preferably coupled directly to the panel 328. Alternatively, the actuator can be coupled indirectly with the panel 328.

Figure 9:
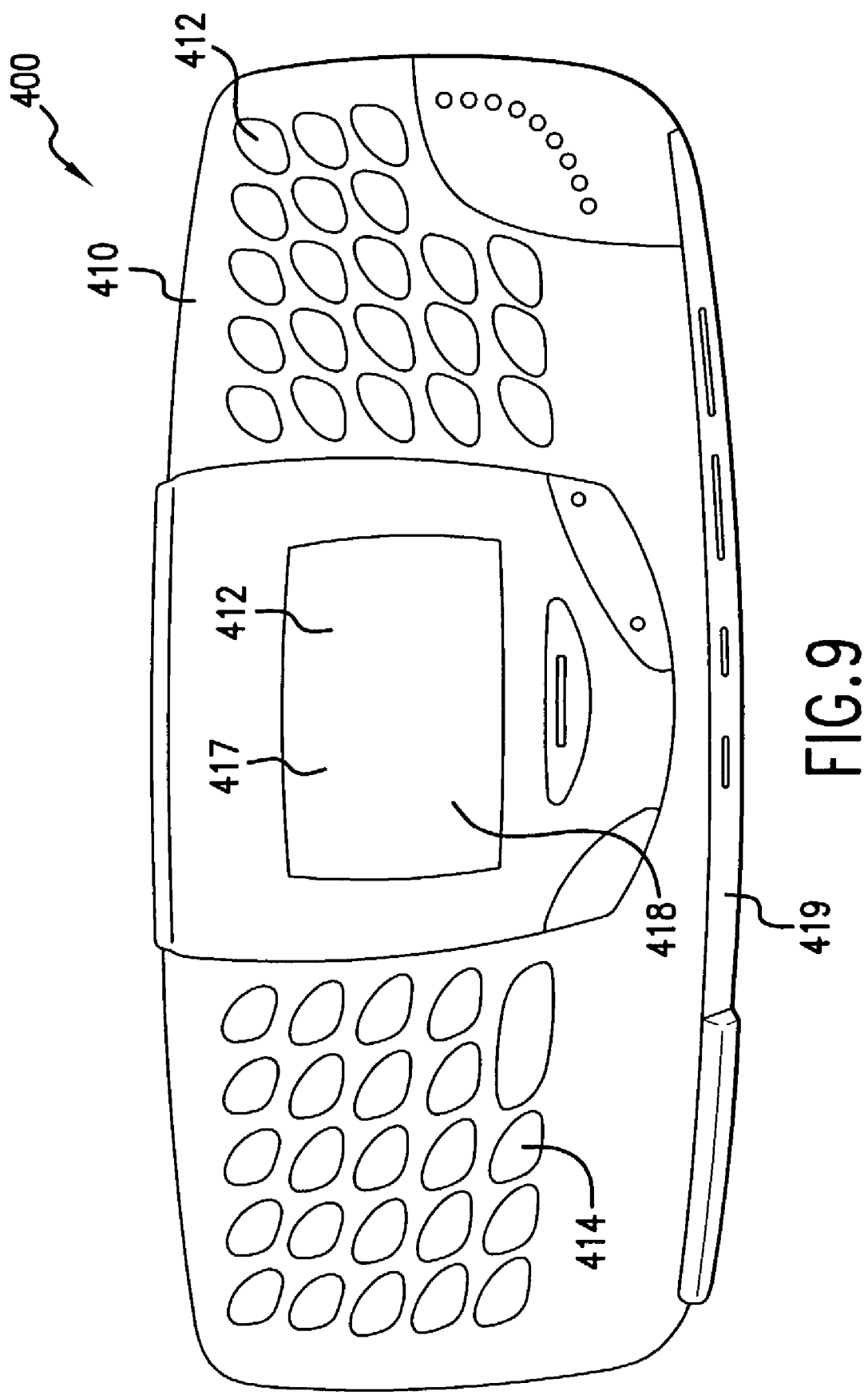
FIG. 9 is a perspective view of a second mobile phone according to another embodiment of the invention.

Referring now to FIG. 9, a perspective view of a mobile phone 400 according to another embodiment of the invention is shown. An input surface 410 of the mobile phone 400 includes a plurality of input elements 412, a display screen 417, and a base 419. Preferably, the input elements 412 include a keypad 414 and a touch-sensitive screen 418 disposed in the display screen 417. Alternatively, there can only be one input element 412, such as the touch-sensitive screen 418.

Figure 10:
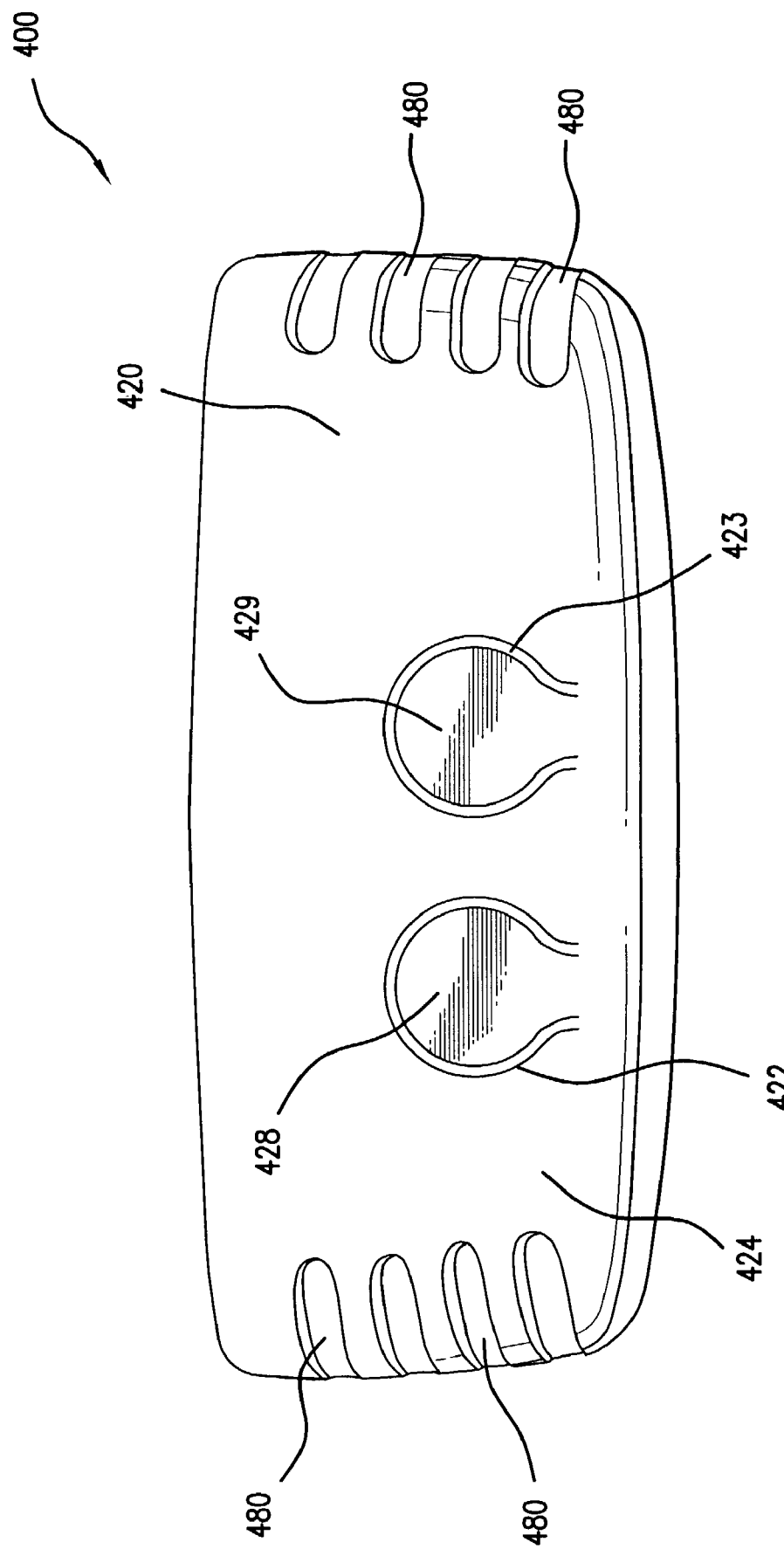
FIG. 10 is a plan view of an off-activating area of the mobile phone of FIG. 9.

Referring now to FIG. 10, a perspective view of an off-activating surface 420 of the mobile phone 400 of FIG. 9 is shown. The off-activating surface 420 includes an exterior surface 424. Disposed in the exterior surface 424 of the off-activating surface 420 are first and second grooves 422 and 423 and a plurality of channels 480. The channels 480 shown are recessed to accept digits of a hand. The channels 480 guide a user's hand when holding the phone 400 and maximize the amount of physical contact between the hand and the off-activating surface 420.

The first and second grooves 422 and 423 are formed through an entire thickness of the off-activating surface 420. Preferably, the first and second grooves 422 and 423 have substantially the same configuration. Alternatively, the first and second grooves 422 and 423 can be formed of different configurations. Preferably, the first and second grooves 422 and 423 are substantially continuous and form substantially circular first and second panels 428 and 429 in the off-activating surface 420. Alternatively, the first and second grooves 422 and 423 can form any other suitable panel.

In this embodiment, first and second panels 428 and 429 are cantilevered from the off-activating surface 420. Thus, the off-activating surface 420 does not actuate with a uniform frequency. For example, first and second panels 428 and 429 proximate the display screen 417 actuate with a greater frequency than the off-activating surface 420 proximate the base 419.

Preferably, a first actuator (not shown) is disposed proximate the first panel 428 and a second actuator (not shown) is disposed proximate the second panel 429. Alternatively, a single actuator (not shown) can be coupled with both or either the first and second panels 428 and 429, as required. As described above, the first and second actuators can be coupled directly to the first and second active panels 428 and 429. Alternatively, the first and second actuators can be coupled indirectly with the first and second active panels 428 and 429. The single actuator can be coupled directly or indirectly with the first and second active panels 428 and 429.

Figure 11:
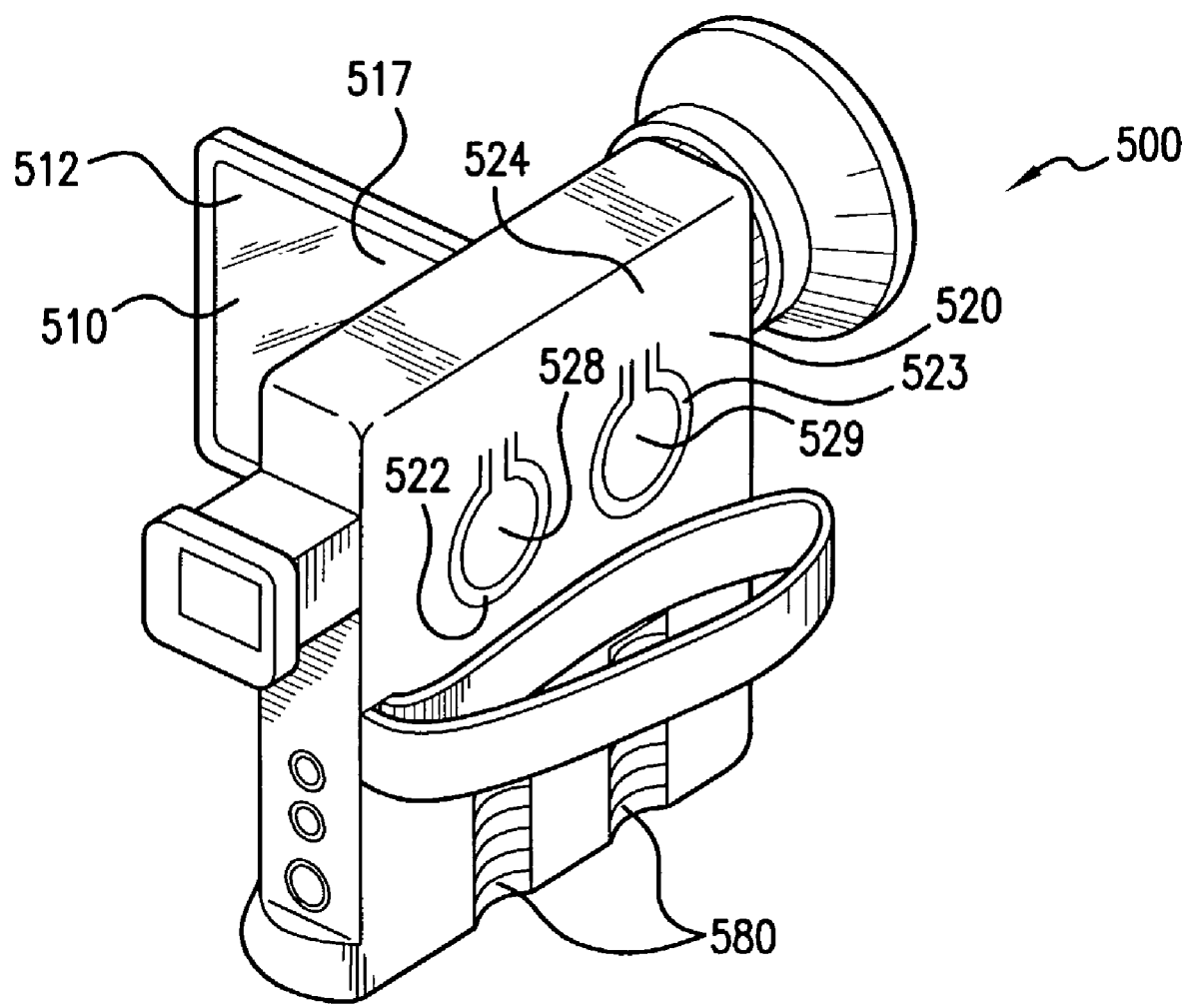
FIG. 11 is a perspective view of a camcorder according to another embodiment of the invention.

Referring now to FIG. 11, a camcorder 500 according to another embodiment of the invention is shown. An input surface 510 of the camcorder 500 includes an input element 512. The input element 512 shown is a touch-sensitive screen, which is disposed in a display screen 517. When the input surface 510 is fully extended, it is disposed substantially orthogonal to an off-activating surface 520. The off-activating surface 520 includes an exterior surface 524. Disposed in the exterior surface 524 are first and second grooves 522 and 523 and a plurality of channels 580.

As described above, the channels 580 shown are recessed to accept digits of a hand. The channels 580 guide a user's hand when holding the camcorder 500 and maximize the amount of physical contact between the hand and the off-activating surface 520. Preferably, first and second grooves 522 and 523 are formed through an entire thickness of the off-activating surface 520. Alternatively, the first and second grooves 522 and 523 can be formed partially through the thickness of the off-activating surface 520.

Preferably, the grooves 522 and 523 have substantially the same configuration. Alternatively, the grooves 522 and 523 can be formed of different configurations. For example, the grooves 522 and 523 can be formed linearly and substantially along a perimeter of the off-activating surface 520, similar to that described above in FIGS. 1-4. Preferably, the grooves 522 and 523 are substantially continuous and form substantially circular first and second panels 528 and 529 in the off-activating surface 520. Alternatively, the first and second grooves 522 and 523 can form any other suitable panel.

The first and second panels 528 and 529 are cantilevered from the off-activating surface 520. As described above, the off-activating surface 520 does not actuate with a uniform frequency. As described above, preferably, a first actuator (not shown) is disposed proximate the first panel 528 and a second actuator (not shown) is disposed proximate the second panel 529. Alternatively, a single actuator (not shown) can be coupled with both or either the first and second panels 528 and 529, as required. As described above, the first and second actuators can be coupled directly with the first and second panels 528 and 529. Alternatively, the first and second actuators can be coupled indirectly with the first and second panels 528 and 529. The single actuator can be coupled directly or indirectly with the first and second panels 528 and 529.

Figure 12:
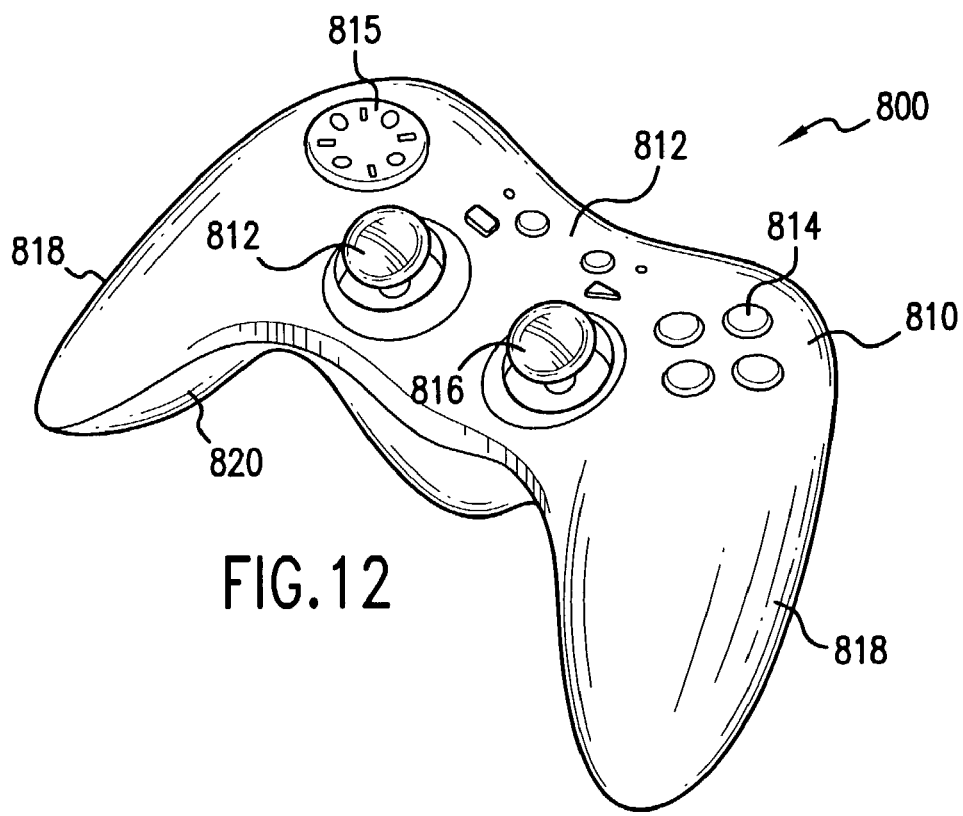
FIG. 12 is a perspective view of a gamepad according to another embodiment of the invention.

FIG. 12 shows a perspective view of a gamepad 800 according to another embodiment of the invention. An input surface 810 of the gamepad 800 includes a plurality of input elements 812, including buttons 814, a directional controller 815, and joysticks 816. Alternatively, any other suitable number or combination of input elements can be used. The gamepad 800 also includes two wings 818 to facilitate grasping the device with two hands.

Figure 13:
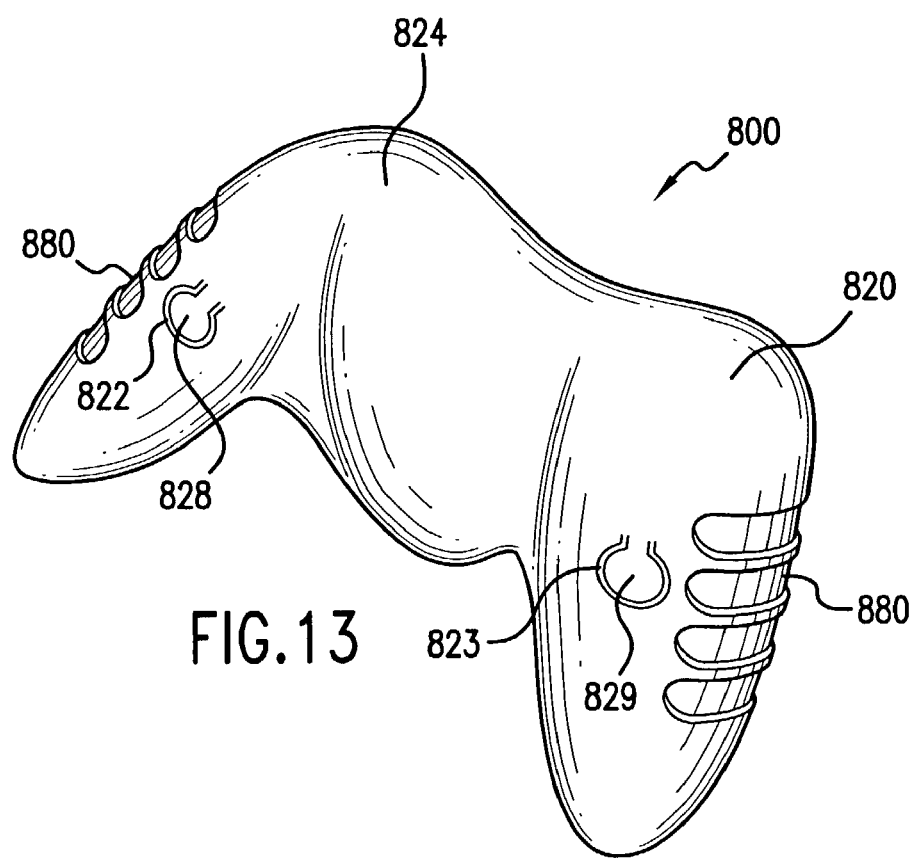
FIG. 13 is a perspective view of an off-activating surface of the gamepad of FIG. 12.

As shown in FIG. 13, the gamepad 800 includes an off-activating surface 820. The off-activating surface 820 includes an exterior surface 824. Disposed in the exterior surface 824 are first and second grooves 822 and 823 and a plurality of channels 880. The first and second grooves 822 and 823 and the channels 880 are formed proximate the wings 818.

The channels 880 shown are recessed to accept digits of a hand. The channels 880 guide a user's hand when holding the gamepad 800 and maximize the amount of physical contact between the hand and the off-activating surface 820. Preferably, first and second grooves 822 and 823 are formed through an entire thickness of the off-activating surface 820.

Preferably, the grooves 822 and 823 have substantially the same configuration. Alternatively, the grooves 822 and 823 can be formed of different configurations. For example, the grooves 822 and 823 can be formed to substantially follow the perimeter of the wings 818. Preferably, the grooves 822 and 823 are substantially continuous and form substantially circular first and second panels 828 and 829 in the off-activating surface 820. Alternatively, the first and second grooves 822 and 823 can form any other suitable panel.

The first and second panels 828 and 829 are cantilevered from the off-activating surface 820. In one embodiment, the first and second panels 828 and 829 are also input elements 812. As described above, the off-activating surface 820 does not actuate with a uniform frequency. Preferably, a first actuator (not shown) is disposed proximate the first panel 828 and the second panel 829. Alternatively, a single actuator (not shown) can be coupled with both or either the first and second panels 828 and 829, as required. The first and second actuators can be coupled indirectly with the first and second panels 828 and 829.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. An apparatus comprising:
   a housing having a plurality of surfaces;
   a first surface of the housing having a touch-sensitive screen;
   a second surface of the housing, the second surface comprising an off-activating area comprising a cantilevered panel, the cantilevered panel configured to actuate at a frequency different than the off-activating area; and
   an actuator in communication with the touch-sensitive screen, the actuator comprising a voice coil actuator or a rotating mass actuator, the actuator configured to provide haptic feedback to the off-activating area in response to an input signal generated by the touch-sensitive screen.

2. The apparatus of claim 1, further comprising a processor local to the apparatus and in communication with the touch-sensitive screen and the actuator, wherein the processor is configured to receive the input signal generated by the touch-sensitive screen and to send an actuator signal to the actuator.

3. The apparatus of claim 2, wherein the processor is configured to produce a plurality of actuator signals configured to cause the actuator to generate a plurality of distinct haptic sensations.

4. The apparatus of claim 2, wherein the actuator signal comprises at least one of a frequency, a waveform, or a magnitude of a haptic sensation, and the processor is configured to vary at least one of the frequency, the waveform, or the magnitude of the haptic sensation.

5. A method comprising the steps of:
   receiving an input signal from a touch-sensitive screen coupled to a housing having a plurality of surfaces, a first surface of the plurality of surface having the touch-sensitive screen and a second surface of the plurality of surfaces, the second surface comprising an off-activating area comprising a cantilevered panel, the cantilevered panel configured to actuate at a frequency different than the off-activating area;
   transmitting an actuator signal to an actuator configured to generate haptic feedback to the off-activating area in response to the input signal, wherein the actuator comprises one of a voice coil actuator or a rotating mass actuator.

6. The method of claim 5, further comprising generating an actuator signal based at least in part on the input signal.

7. The method of claim 6, further comprising generating a plurality of actuator signals configured to generate a plurality of distinct haptic sensations.

8. The method of claim 6, wherein the actuator signal comprises at least one of a frequency, a waveform, or a magnitude of a haptic sensation, and the processor is configured to vary at least one of the frequency, the waveform, or the magnitude of the haptic sensation.

9. A computer-readable medium on which is encoded program code comprising:
   program code for receiving an input signal from a touch-sensitive screen coupled to a housing having a plurality of surfaces, a first surface of the plurality of surface having the touch-sensitive screen and a second surface of the plurality of surfaces, the second surface comprising an off-activating area comprising a cantilevered panel, the cantilevered panel configured to actuate at a frequency different than the off-activating area; and
   program code for transmitting an actuator signal to an actuator configured to generate haptic feedback to the off-activating area in response to the input signal, wherein the actuator comprises a voice coil actuator or a rotating mass actuator.

10. The computer readable medium of claim 9, further comprising program code for transmitting an actuator signal to an actuator.

11. The computer readable medium of claim 10, further comprising program code for generating a plurality of actuator signals configured to generate a plurality of distinct haptic sensations.

12. The computer readable medium of claim 10, wherein the actuator signal comprises at least one of a frequency, a waveform, or a magnitude of a haptic sensation, and the processor is configured to vary at least one of the frequency, the waveform, or the magnitude of the haptic sensation.

* * * * *

UNITED STATES PATENT AND TRADEMARK OFFICE
CERTIFICATE OF CORRECTION

| | |
|---|---|
| PATENT NO. | : 7,769,417 B2 |
| APPLICATION NO. | : 10/314017 |
| DATED | : August 3, 2010 |
| INVENTOR(S) | : Kollin Tierling et al. |

It is certified that error appears in the above-identified patent and that said Letters Patent is hereby corrected as shown below:

Page 2, Column 1, line 30, please insert -- 5,188,685 A 2/1993 Mangseth et al. --.

Page 3, Column 1, line 59, After "pp." please delete "83-70.", and insert -- 63-70. --.

Signed and Sealed this

Sixteenth Day of November, 2010

David J. Kappos
*Director of the United States Patent and Trademark Office*